WILLIAM L. MEDLIN INVENTOR.

BY *William P. Jackson*

ATTORNEY

United States Patent Office 3,317,727
Patented May 2, 1967

3,317,727
CHARACTERIZING THERMOLUMINESCENT MATERIAL BY MEANS OF ITS ISOTHERMAL DECAY OF PHOSPHORESCENCE
William L. Medlin, Dallas, Tex., assignor to Mobil Oil Corporation, a corporation of New York
Filed June 18, 1963, Ser. No. 288,669
6 Claims. (Cl. 250—71)

This invention involves a method of characterizing materials such as geologic formations on the basis of their decay of phosphorescence associated with thermoluminescence. More particularly, the invention involves measuring the relative energy level distribution of electron trapping centers in such materials and using the measured distribution to characterize the materials.

Thermoluminescence is a phenomenon due to impurity defects in a crystal which result in lattice distortions that form electron trapping centers. Upon heating, electrons in these centers are excited to a higher energy level through which they are released from their respective centers and returned to a lower energy level, that is, ground state. As the electrons return to ground state, they emit light energy.

It has heretofore been proposed to characterize materials by means of their thermoluminescence. For example, in the fields of geology and geophysics, methods have been devised for correlating or dating geologic formations on the basis of their natural thermoluminescence. In these methods, natural thermoluminescence is generally measured by heating a sample of a geologic formation at a constant rate and measuring the light emitted as a function of temperature. The emission from the sample is plotted as a function of temperature to give a glow curve. Glow curves have several peaks of emission intensities. A high temperature glow-curve peak is determined between arbitrarily chosen temperature limits and the area under the curve between these limits is then measured, for example, by planimetry. A plurality of samples of the formation under investigation are then heated to remove all natural thermoluminescence, and thereafter irradiated, each by a successively larger quantity of ionizing radiation. The samples are then heated, and glow curves due to the artificial irradiation are obtained. The areas under these artificial glow curves between the above temperature limits are measured in the same manner as the natural glow curve to obtain a calibration curve in which the area under a glow curve is plotted against the total cumulative amount of radiation. The total cumulative radiation equivalent to the glow curve area for the natural glow curve can thus be determined; and this cumulative radiation divided by the natural radioactivity, e.g., net alpha count per hour of the natural sample, gives a value which is indicative of the age of the rock.

These methods possess several serious disadvantages. The artificial irradiation should be carried out at the ambient temperature of the rock sample. This is often difficult to determine and, in addition, it may have changed materially during the history of the formation. Furthermore, the radioactivity of the formation may be distributed unevenly. Also, the kind of radioactivity, i.e., alpha, beta, and gamma content, may have changed materially during the history of the rock so that the measured radioactivity may not be representative of the kind of radioactivity at earlier times.

In addition to the glow-curve measurement, the intensity of emission may be measured as a function of time at a constant temperature. This latter measurement is called a phosphorescent decay curve. The isothermal decay of phosphorescence for many thermoluminescent materials, for example, common rock minerals such as calcite, dolomite, anhydrite, quartz, magnesite, and aragonite, obeys, over a portion of the decay, the empirical equation:

$$I = I_0 \left(\frac{b}{b+t}\right)^m \tag{1}$$

wherein

I is the intensity of emission at a time $t$,
$I_0$ is the intensity at $t=$zero, and
$m$ and $b$ are parameters.

The units of $I$ and $t$ may be chosen arbitrarily, but it will usually be convenient to place $t$ in seconds; $b$, of course, will be in the same units as $t$. The exponential parameter $m$ is of course dimensionless.

The present invention is based upon the discovery that the electron trapping centers associated with the same glow peak are not at a single energy level, but, rather, are distributed over a range of energies; that the energy level distribution of trapping centers in a function of age; and that the parameter $b$ in Equation 1 is a function of this distribution, and therefore representative thereof.

It is an object of the invention to provide a method of determining the relative energy level distribution of electron trapping centers in thermoluminescent materials.

It is another object of the invention to provide a method in which the relative energy level distribution of electron trapping centers may be used to characterize thermoluminescent materials and in particular to correlate geologic formations or characterize them with respect to their ages.

It is a further object of the present invention to provide a method of correlating geologic formations or determining the ages thereof on the basis of their thermoluminescence which eliminates the natural radioactivity of the formation as a parameter.

In carrying out the invention, at least a portion of the material to be characterized is irradiated with ionizing radiation. The irradiation is terminated, and the phosphorescent emission of the material is measured as a function of time while maintaining the material at an essentially constant temperature. Thereafter, the measured phosphorescence is used to characterize the material.

In a particular embodiment of the invention, a sample is obtained from a geologic formation and the relative energy level distribution of electron trapping centers therefor is measured. The measured distribution is correlated with the relative energy level distribution of electron trapping centers for a thermoluminescent sample of known age to determine the age of the formation under investigation.

In a preferred embodiment of the invention, the relative energy level distribution of electron trapping centers for a thermoluminescent material is measured by irradiating a sample of the material with ionizing radiation and then measuring the phosphorescent emission of the sample as a function of time at a constant temperature which is associated with only a single glow peak. The material is then characterized by comparing the distribution thus measured with the relative energy level distribution of electron trapping centers for a second material of similar chemical composition and crystal structure. The distribution for the second material is obtained under essentially the same conditions of temperature and total cumulative amount of radiation as that for the first material.

A more detailed description will now be given with reference to the several drawings in which.

As noted above, the isothermal decay of phosphorescence for many common rock minerals obeys the equation:

$$I = I_0 \left( \frac{b}{b+t} \right)^m$$

wherein $b$ and $m$ are parameters. These parameters vary with the material under investigation. It has been discovered that annealing a sample at elevated temperatures will produce a marked increase in the value of $b$. For example, in a calcite sample, annealing for one hour at a temperature of 500° C. produced an increase in $b$ of from fifty seconds to one hundred seconds. Since this annealing treatment is representative of the annealing effect of temperature upon the rock during its geologic time, i.e., the time period since its formation, the value of $b$ for a thermoluminescent rock of any particular composition and crystal structure is indicative of its age. Therefore, the relative ages of rocks of similar composition and crystal structure can be determined by fitting their respective decay curves, measured under the same conditions, to Equation 1 and determining the value of $b$ for each rock.

An explanation of this effect of annealing or aging upon the isothermal decay of phosphorescence is made below. It will be understood, however, that the invention is not to be limited by the theory upon which it is based.

As stated above, thermoluminescence is due to electron trapping centers which may hold electrons at an energy level higher than their ground state. These trapping centers are formed by impurity defects introduced into the crystal lattice when it is formed. Such defects may be due to the presence of a foreign element, for example, iron or manganese, in a calcite crystal, or the abnormal absence or presence of cations or anions in the crystal lattice.

Figure 1:
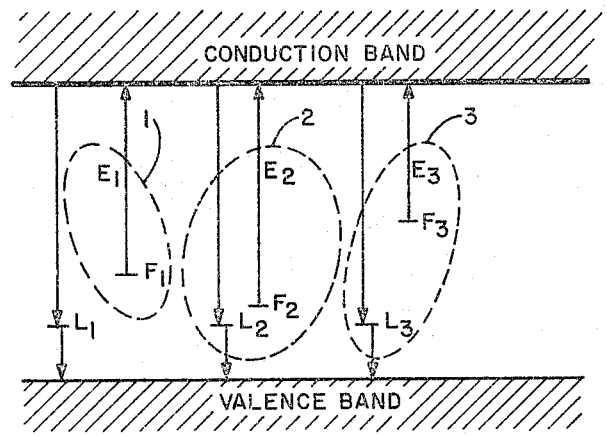
FIGURE 1 is an energy level diagram of a crystal showing a relatively broad energy level distribution of electron trapping centers.

The trapping centers may be distributed through a range of energy levels. The concept of wide and narrow energy level distributions will be explained with reference to FIGURES 1 and 2 which schematically show trapping centers in a crystal. In FIGURE 1, broken lines 1, 2, and 3 indicate trapping centers associated with the same glow peak. Referring to trapping center 1, an electron is trapped therein at an energy level $F_1$. The electron trapped at level $F_1$ can be removed by exciting it by thermal energy to the conduction band from which it will return to the valence band (ground state) through a luminescent level $L_1$. The transition from $L_1$ to the valence band produces emission of light. From an inspection of FIGURE 1, it will be seen that the energy $E_2$ required to excite an electron from level $F_2$ to the conduction band is greater than the energy $E_1$ required to excite an electron from $F_1$ to the conduction band. On the other hand, the energy required to excite an electron from level $F_3$ to the conduction band is appreciably less. Thus, in the illustration of FIGURE 1, the energy levels of the several trapping centers are widely distributed.

Figure 2:
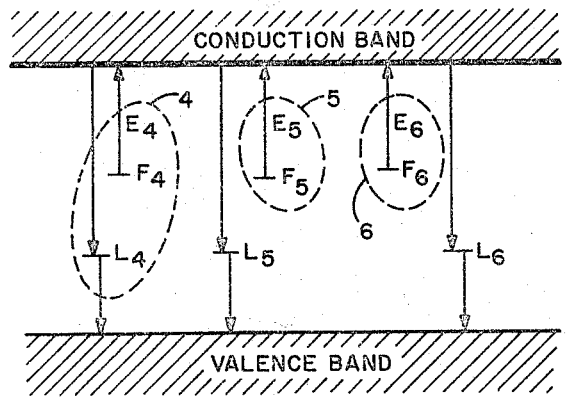
FIGURE 2 is an energy level diagram of a crystal showing a relatively narrow energy level distribution of electron trapping centers.

In FIGURE 2, broken lines 4, 5, and 6 indicate trapping centers similar to those shown in FIGURE 1. In this case, however, the amount of energy required to release an electron from its respective trapping center is approximately the same for all centers associated with the same glow peak. Thus, in the illustration of FIGURE 2, the energy level distribution of electron trapping centers in the crystal is relatively narrow as compared with the distribution in the crystal shown in FIGURE 1.

In the illustrations of FIGURES 1 and 2, the electrons are released from their trapping levels to a common conduction band from which they return to ground state through luminescent levels. The luminescent levels may be associated with a trapping center as in the case of $L_4$ or they may be associated with separate defect centers as in the case of $L_5$ and $L_6$. This emptying of traps through the conduction band is termed second order decay.

The traps also may be emptied by first order decay in which electrons are confined to their respective trapping centers during the transitions by which they are released from trapping levels and returned to the ground state. In this case, and electron is released by exciting it from its trapped level to a higher energy level within the trapping center from which is returns to the valence band through a luminescent level which is also within the trapping center. As in the case of second order decay, the energy level distribution of electron trapping centers may be relatively narrow or relatively broad.

Regadless of whether the traps are emptied by first or second order decay, the parameter $b$ in Equation 1 is a function of the energy level distibution of the electron trapping centers. The value of $b$ for a relatively wide distribution as illustrated in FIGURE 1 will be less than that for the narrower distribution illustrated in FIGURE 2. In a newly formed crystal with a relatively high degree of lattice distortions, the distribution is broad. As the crystal is annealed at ambient rock temperature over its geologic time, it tends to return to a state of lower energy and the lattice distortions are lessened. This will result in a decrease in the width of the trapping level distribution. Thus, the energy level distribution of trapping centers is a function of age. Since the parameter $b$ in Equation 1 is a function of such distribution, the value thereof for a particular rock is representative of its age.

In carrying out the method of the present invention, a sample of the material under investigation is brought to a temperature associated with only a single glow peak so that the light emission is predominantly due to only one set of trapping levels. Generally, this should be within the range of 50° C. of a glow peak, although for some materials a temperature within a range of 100° C. of a glow peak is adequate. The temperature of the sample is maintained constant throughout the decay measurements. As soon as the temperature has become constant, the sample is irradiated by ionizing radiation, i.e., electron exciting radiation such as gamma rays or X-rays which will fill the traps, for a predetermined time $t_0$, for example, from one minute to one hour. Thereafter, the irradiation is terminated and the emission of light is measured as a function of time.

Preferably, the temperature at which the decay measurements are carried out is below the temperatures at which glow peaks occur due to natural thermoluminescence. This eliminates the necessity of removing the natural thermoluminescence from the sample prior to carrying out the measurements. If the measurements are to be carried out at a temperature where the decay is associated with a high temperature glow peak, it will be necessary to preheat the sample in order to remove the natural thermoluminescence. This normally may be accomplished by preheating the sample to a temperature of about 700°–750° Kelvin.

After the decay measurements are completed, the isothermal decay curve obtained is fitted to Equation 1 in order to determine the value of $b$. In fitting the decay curve to Equation 1 the first fifteen, and in some cases the first forty-five, seconds of the curve should not be used since this early portion of the curve is affected by the rapid emptying of shallow traps, that is, those traps from which electrons may be released by the application of only a relatively small quantity of energy. Also, the isothermal decay curve will begin to depart from Equation 1 after a period of about one hour after termination of irradiation. As a general rule, therefore, only the decay measurements in the period of about one to sixty minutes after irradiation has ceased should be used in the determination of $b$.

The value of $b$ thus obtained may then be compared with the value of $b$ for a second material in order to characterize the material under investigation. The value of $b$ is a characteristic of chemical composition and crystal structure, so the second material must be of similar chemical composition and crystal structure as the material under investigation. Preferably, the chemical composition and crystal structure of both materials will be identical. However, the comparative tests may be carried out within a reasonable degree of accuracy on samples of varying composition and crystal structure so long as the phosphorescent emission is due predominantly to the same material. For example, the $b$ value for a rock sample consisting of 90% calcite, 9% dolomite, and 1% quartz may be compared with the $b$ value of a pure calcite sample since in both cases the emission measured will be primarily from calcite. It will be understood, therefore, that the phrase "similar chemical composition and crystal structure" is not limited to samples of identical composition and crystal structure, but includes as well all samples in which the measured emission is due predominantly to a common material.

The value of $b$ is also related to the temperature at which the decay measurements are carried out and the total cumulative amount of artificial radiation, so these must be essentially the same for both materials. The latter condition can be most easily met by using the same irradiation time $t_0$ and irradiation rate for both materials.

It is apparent that a comparison of the $b$ values for the two materials will give the relative energy level distribution of electron trapping centers for these materials. In th case of rocks, these distributions are indicative of their ages. Therefore, a comparison of their distributions will give the relative ages of the two rocks. Also, the method of the instant invention can be used for absolute age determination by correlating the $b$ value of rocks of unknown age with the $b$ value of rocks of known age. The invention also provides a method for the correlation of laterally displaced geologic strata. For example, strata in a faulted zone can be correlated by comparing the $b$ values of samples obtained from both sides of the fault. It will be understood that the invention is applicable to the characterization of rocks in situ. For example, the invention may be applied as a logging technique in which the phosphorescent decay of a portion of earth material adjacent a borehole is measured.

Figure 3:
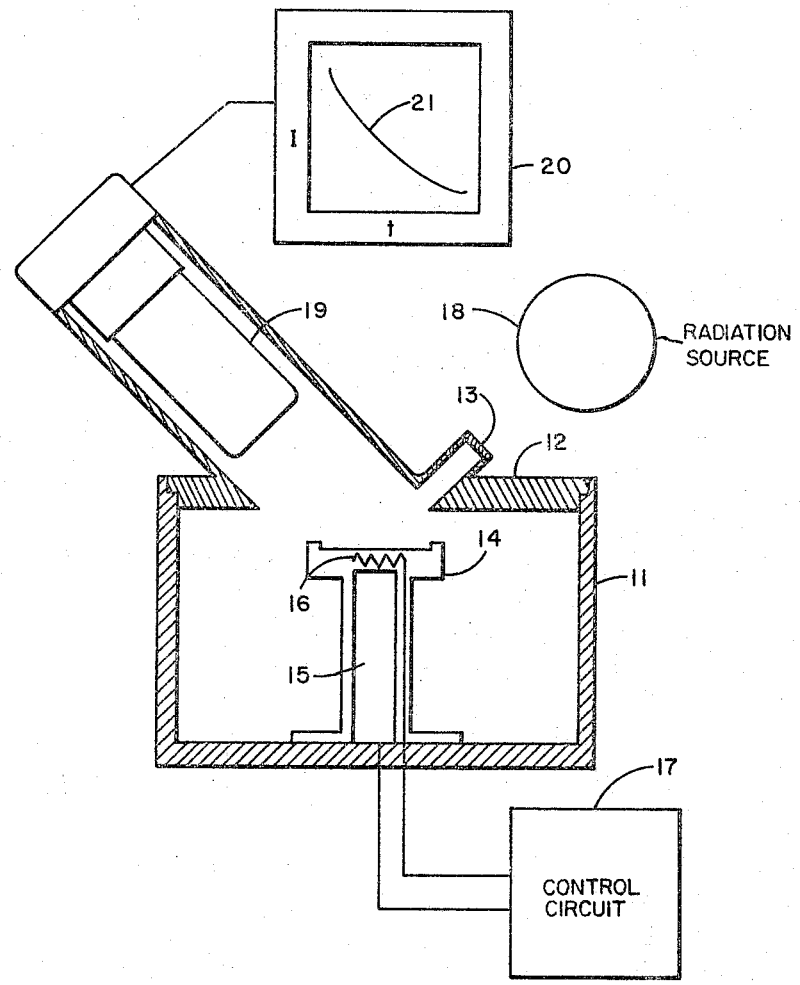
FIGURE 3 is a sectional view of an apparatus suitable for carrying out the present invention.

An apparatus suitable for carrying out the phosphorescent decay measurements is illustrated in FIGURE 3. This apparatus comprises a light tight enclosure 11, a cover 12 therefor having a beryllium window 13, a sample holder 14, a heating element 15, a temperature sensing element 16 and control circuit 17 for maintaining the sample at a constant temperature, a source of ionizing radiation 18, a photomultiplier 19, and a recorder 20.

In carrying out the decay measurements, the sample is ground into powder form and placed on the sample holder 14. After the temperature of the sample becomes constant, it is irradiated by ionization radiation for the desired time $t_0$. The radiation source is then turned off and the decay measurements are started with the photomultiplier measuring the light intensity and producing a signal indicative thereof which is recorded by the recorder 20 as a function of time.

The value of $b$ may be determined by fitting the decay curve 21 shown on the recorder to Equation 1 which can be written in logarithmic form:

$$\log I = \log I_0 + m \log b - m \log (b+t) \quad (2)$$

Since $\log I_0 + m \log b$ will be constant for a given decay curve, Equation 2 can be written as follows:

$$\log I = k - m \log (b+t) \quad (3)$$

wherein the constant $k$ is given by $$k = \log I_0 + m \log b$$

Equation 3 is the expression for a straight line and can theretfore be solved for $b$ by determining the value thereof which will give a straight line for the plot of log $I$ v. log $(b+t)$.

In the illustration given above, the relative energy level distribution of electron trapping centers for a thermoluminescent material is measured indirectly by first measuring the isothermal decay of phosphorescence and then solving Equation 3 for $b$. However, it will be understood that the relative distribution may be measured directly. This may be accomplished, for example, through the use of a computer which receives signals from the photomultiplier and converts them into a value representative of the relative distribution.

Having described certain specific embodiments of the invention, it is understood that further modifications may be suggested to those skilled in the art, and it is intended to cover all such modifications as fall within the scope of the appended claims.

I claim:
1. A method of characterizing a thermoluminescent material on the basis of its isothermal decay of phosphorescence, comprising the steps of:
 (a) bringing at least a portion of the material to an essentially constant temperature within a range of 100° C. of a glow peak of said material,
 (b) irradiating said portion of material with ionizing radiation for a time $t_0$,
 (c) thereafter measuring the phosphorescent emission of said portion of material whereby an isothermal decay curve is obtained, at least a portion of which obeys the equation:

$$I = I_0 \left(\frac{b}{b+t}\right)^m$$

wherein
 I is the intensity of emission,
 t is time,
 $I_0$ is the intensity of emission at $t$=zero, $m$ is a dimensionless parameter, and $b$ is a parameter in the same units as $t$,
 (d) obtaining the relative energy level distribution of electron trapping centers for said decay curve, and
 (e) characterizing said material by comparing said distribution with the relative energy level distribution of electron trapping centers for a second material of similar chemical composition and crystal structure obtained under essentially the same conditions of temperature and total cumulative amount of radiation as said distribution for said first material.
2. A method of determining the age of an earth formation, comprising the steps of:
 (a) obtaining a sample of thermoluminescent material from the formation,
 (b) bringing said sample to an essentially constant temperature within a range of 100° C. of a glow peak of said material,
 (c) irradiating the sample with ionizing radiation for a time $t_0$,
 (d) thereafter measuring the phosphorescent emission of said sample whereby an isothermal decay curve is obtained at least a portion of which obeys the equation:

$$I = I_0 \left(\frac{b}{b+t}\right)^m$$

wherein
 I is the intensity of emission,
 t is time,
 $I_0$ is the intensity of emission at $t$=zero,
 $m$ is a dimensionless parameter, and
 $b$ is a parameter in the same units as $t$ representative of the sample's age, (e) fitting said decay curve to said equation and determining the value of $b$, and
(f) correlating the value of $b$ for said sample with the value of $b$ for a second earth material of known age and similar chemical composition and crystal structure obtained under essentially the same conditions of temperature and total cumulative amount of radiation as the value of $b$ for said first sample.

3. The method of claim 1 wherein said temperature is within a range of 50° C. of a glow peak of said material.

4. The method of claim 2 wherein said temperature is within a range of 50° C. of a glow peak of said material.

5. A method of characterizing a plurality of earth formations with respect to their relative ages, comprising the steps of:
   (a) obtaining thermoluminescent samples of similar chemical composition and crystal structure from each of said formations;
   (b) heating said samples to a temperature at least as great as the essentially constant temperature maintained in step (d) to remove the natural thermoluminescence existing at said temperature;
   (c) irradiating each of said samples with essentially the same cumulative total amount of ionizing radiation;
   (d) measuring the phosphorescent emission of each of said samples while maintaining said samples at an essentially constant temperature, said temperature being essentially the same for each of said samples; and
   (e) characterizing the formations as to their relative ages on the basis of the measured phosphorescent emissions of said samples.

6. A method of correlating rocks at different locations in the earth's crust, comprising the steps of:
   (a) obtaining thermoluminescent samples of similar chemical composition and crystal structure from each of the rocks to be correlated;
   (b) heating said samples to a temperature at least as great as the essentially constant temperature maintained in step (d) to remove the natural thermoluminescence existing at said temperature;
   (c) irradiating each of said samples with essentially the same total cumulative amount of ionizing radiation;
   (d) measuring the phosphorescent emission of each of said samples while maintaining said sample at an essentially constant temperature, said temperature being essentially the same for each of said samples; and
   (e) correlating said rocks on the basis of the measured phosphorescent emissions of said samples.

References Cited by the Examiner

UNITED STATES PATENTS

| | | | |
|---|---|---|---|
| 2,573,245 | 10/1951 | Boyd | 250—83.3 |
| 2,899,558 | 8/1959 | Lewis | 250—65 |
| 3,008,047 | 11/1961 | Earley | 250—71.5 |
| 3,033,985 | 5/1962 | Petree | 250—83.3 |

OTHER REFERENCES

Le Verenz, H. W.: An Introduction to Luminescence of Solids, John Wiley & Sons, Inc., New York, 1950, pp. 256–299.

Luminescence of Liquids and Solids by Pringsheim et al., Interscience Publishers, Inc., New York, 1943, pp. 12 to 19, 60 to 65, 95 to 100, 120, and 121.

ARCHIE R. BORCHELT, *Primary Examiner.*

JAMES W. LAWRENCE, RALPH G. NILSON,
*Examiners.*